Oct. 5, 1971  D. R. PARRIS  3,610,055
CHAIN DRIVE ASSEMBLY
Filed April 30, 1970  2 Sheets-Sheet 2

INVENTOR.
DAVID REGINALD PARRIS

United States Patent Office 3,610,055
Patented Oct. 5, 1971

3,610,055
CHAIN DRIVE ASSEMBLY
David Reginald Parris, West Horndon, England, assignor to Rotary Hoes Limited, West Horndon, Essex, England
Filed Apr. 30, 1970, Ser. No. 33,267
Claims priority, application Great Britain, May 10, 1969, 23,922/69
Int. Cl. F16h 7/10, 37/00, 37/02
U.S. Cl. 74—11                                    8 Claims

ABSTRACT OF THE DISCLOSURE

A chain drive assembly particularly for use in transmitting drive to a rotor carried on an agricultural implement includes chain sprockets which are interconnected by a drive chain. The sprockets and chain are located in a sealed casing and the sprockets have different numbers of teeth. The casing is mounted on the implement and can be turned about its mounting point to engage one or other of the sprockets with a driving shaft and thereby vary the relative speeds of the driving and dirven shafts.

---

Figure 1:
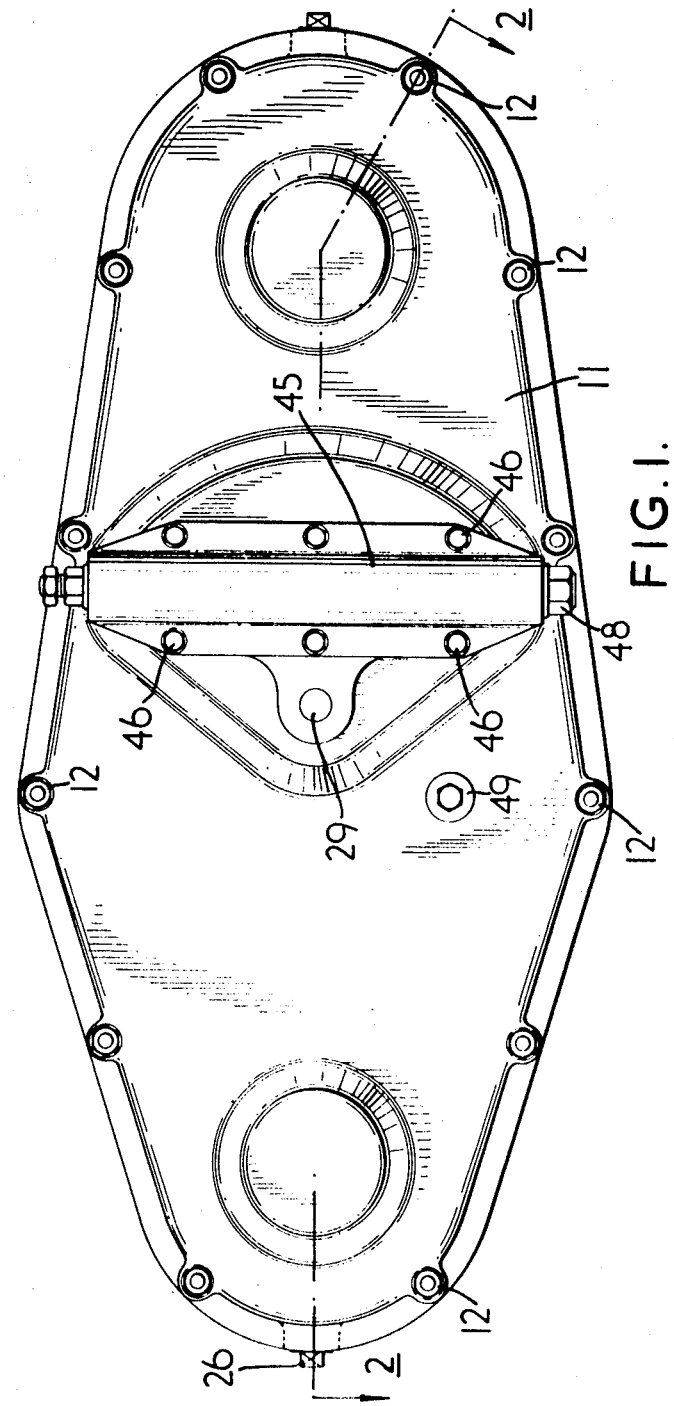

This invention relates to a chain drive assembly which provides change speed means for changing the relative speeds between driving means and driven means.

When chain drives are provided in the drive arrangement between a driving and a driven member, in order to effect a change in the relative speeds of the drive and the driven member change speed gearing between the members has hitherto been provided or a chain drive sprocket has been replaced by another chain drive sprocket having a different number of teeth.

An object of the invention is to provide a chain drive assembly, for drivably connecting a driving and a driven member, in which a simple and speedy change speed means is included.

According to the invention a chain drive assembly comprises a casing, two rotatable chain sprockets having different numbers of sprocket teeth and mounted in the casing, a drive chain for engagement with each of the sprockets, and mounting means located midway between the axes of the sprockets, the casing being rotatable about the mounting means to selectively engage one of the sprockets with driving means and the other of the sprockets with driven means, to thereby provide change speed means between the driving and the driven means.

Preferably the sprockets are each formed with splined bores to be drivingly engaged by splined shafts constituting the driving or the driven means. In this way the sprockets can be readily removed from engagement with the shafts and the casing rotated to re-engage the shafts with the other sprockets.

The mounting means may be a bore defined by the casing and arranged to receive securing means by which the assembly is to be supported from the machine with which the assembly is associated.

Figure 2:
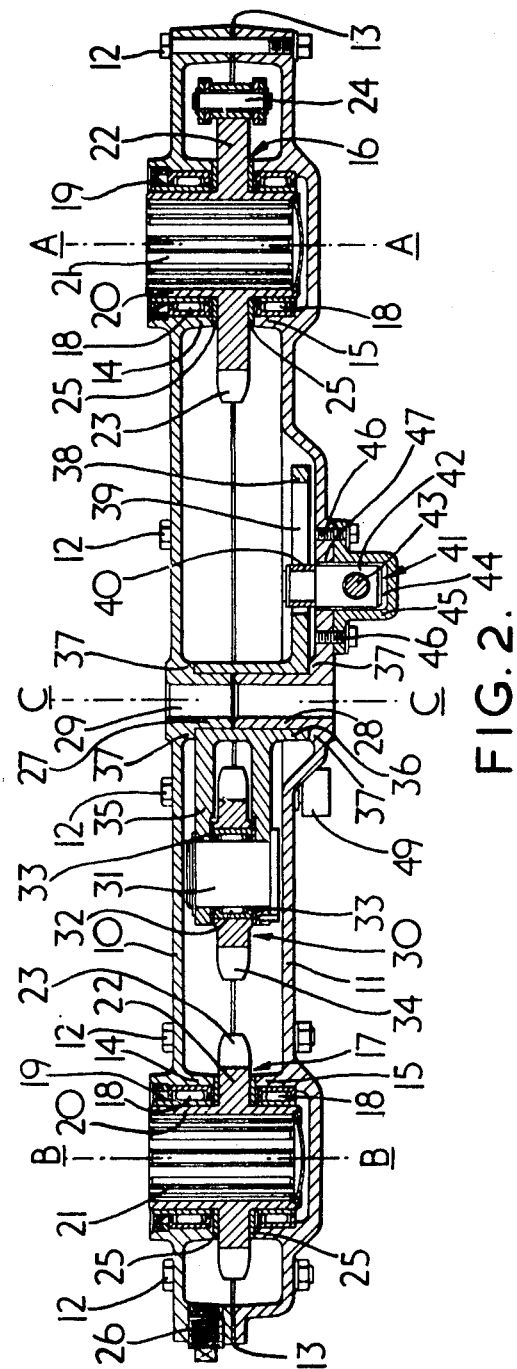

Further features of the invention appear from the following description of an embodiment of the invention given by way of example only and with reference to the drawing, in which:

FIG. 1 is a plan view, and
FIG. 2 is a section on the line 2—2 in FIG. 1.

Referring to the drawing a chain drive assembly is of a form suitable for use in transmitting drive from a driving shaft to a driven shaft (neither of which are shown) of a rotary cultivator.

The assembly includes a casing formed in two halves 10 and 11 secured together by peripherally located nuts and bolts 12, a gasket 13 being located between the mating surfaces of the casing halves 10 and 11.

Bosses 14 and 15 integral with the casing are formed in each end of the housing for the location of sprockets 16 and 17. Each sprocket 16 and 17 is located in needle bearings 18 between their respective bosses and an oil seal 19 surrounds one end of each sprocket.

The sprockets 16 and 17 are each formed with a hollow shaft 20 having a splined bore 21 and an integral annular disc 22 formed with sprocket teeth 23. The sprocket 16 is rotatable about an axis A—A and the teeth, sixteen in number in this arrangement, are engaged by a drive chain 24 (only part of which is shown) of known form. Annular washers 25 are located between each side of the disc 22 and the bosses 14 and 15.

The sprocket 17 is of similar form to the sprocket 16 except that in the present arrangement the sprocket 17 has twelve teeth 23. The sprocket 17 also drivingly engages the chain 24 and the sprocket 17 is rotatable about an axis B—B.

At each end of the casing adjacent the sprockets 16 and 17 is a drain plug 26 for draining lubricating oil from the casing.

The casing halves 10 and 11 are formed with integral inwardly extending hollow cylindrical extensions 27 and 28 respectively. When the casing is assembled the extensions 27 and 28 are coaxial and together define a continuous bore 29 extending from one side of the casing to the other side. The extensions 27 and 28 constitute mounting means whereby the casing is supported from the machine with which the drive assembly is associated. The axis of the bore 29 is located midway between the axes A—A and B—B of the sprockets 16 and 17 and is designated by C—C in the drawing.

In one arrangement the drive assembly is secured in position on the associated machine by a bolt (not shown) extending through the bore 29 into screw-threaded engagement with a backing plate (not shown).

Alternatively the drive assembly is secured to the associated machine by a shaft (not shown) extending from a backing plate (not shown) of the machine and through the bore 29. A nut engages the shaft to secure the assembly to the machine.

With the first-mentioned securing arrangement in order to rotate the casing about the axis C—C the bolt is removed from the bore 29 and the casing is rotated bodily after disengaging the driving and driven shafts from the sprockets 16 and 17.

In the second securing arrangement the nut is removed from the shaft and the shafts are disengaged from the sprockets by withdrawing the casing. The shaft is of sufficient length to support the casing in the withdrawn position whilst rotating the casing about the shaft.

Due to the relative positions of the axes A—A, B—B and C—C the driving and driven shafts can be engaged with either of the sprockets 16 and 17 on rotation of the casing 180° about the axis C—C. The driving shaft and the driven shaft have splined portions corresponding to the splined bores 21 so as to drivingly engage with the bores.

A jockey sprocket 30 (FIG. 2) is located about a jockey shaft 31 on a needle bearing 32 and washers 33. The sprocket 30 has 10 sprocket teeth 34 about its periphery and is in the form of an annular disc rotatable about an axis parallel to the axes A—A, B—B and C—C. The shaft 31 is carried on a U-shaped bracket 35 integral with a cylindrical member 36 located pivotally about the extensions 27 and 28. The member 36 is located axially of the extensions 27 and 28 by shoulders 37 formed on the extensions.

A jockey arm 38 integral with the member 36 and the bracket 35 extends from the member 36 in the opposite directions to the bracket 35 and is formed with a slot 39 in which is located a roller 40 of adjustment means 41. The roller 40 is located rotatably on one end of a trunnion 42 and the trunnion 42 has a transverse screw-threaded bore in which is located a screw-threaded shaft 43. The trunnion 42 is movable along a channel 44 formed in a channel-section plate 45 secured by bolts 46 to the casing and the trunnion 42 extends through a slot 57 in the casing. The shaft 43 extends through the channel 44 from one end to the other and is rotatable to adjust the position of the trunnion along the shaft by means of a nut 48. Upon movement of the trunnion along the channel 44 the roller 40 bears on a side of the slot 39 in the arm 38 to pivot the arm and the bracket 35 about the axis C—C. In this way the axis of rotation of the sprocket 30 can be moved from a position at one side or the other of an imaginary line joining the axes A—A and B—B. Thus the position of the sprocket 30 can be adjusted by the adjustment means 41 to engage the slack side of the chain 24 in accordance with the relative positions of the sprockets 16 and 17 and the driving and driven shafts and the direction of rotation of the shafts.

A breather assembly 49 is located on one side of the casing.

As a further alternative to the arrangement described above the casing may be rotatably secured to the associated machine by means of a spigot and journal mounted on the machine backing plate and on the casing.

The extent of movement of the jockey sprocket 30 is from a position coaxial with the axis of the breather assembly 49 to a position at the opposite side of the casing at the same distance from the line joining the axes A—A and B—B as in the first position.

It will be seen that the drive assembly described above provides an arrangement by which the relative speeds of the driving and driven shafts can be readily changed to give two alternative speed relationships. By exchanging the sprockets for sprockets having different numbers of teeth further speed relationships may be obtained.

What I claim as my invention and desire to secure by Letters Patent of the United States is:

1. A chain drive assembly comprising a casing, two rotatable chain sprockets having different numbers of sprocket teeth and mounted in the casing, a drive chain for engagement with each of the sprockets, and mounting means located midway between the axes of the sprockets, the casing being rotatable about the mounting means to selectively engage one of the sprockets with driving means and the other of the sprockets with driven means, to thereby provide change speed means between the driving and the driven means.

2. A chain drive assembly according to claim 1 wherein the sprockets are each formed with splined bores to be drivingly engaged by splined shafts constituting the driving driven means.

3. A chain drive assembly according to claim 1 wherein the mounting means is a bore defined by the casing and arranged to receive securing means by which the assembly is to be supported from the machine with which the assembly is associated.

4. A chain drive assembly according to claim 1 wherein the casing is sealed so as to contain lubricant within the casing.

5. A chain drive assembly according to claim 1 wherein a jockey sprocket for tensioning the drive chain is located adjustably so as to engage with the slack side of the drive chain whichever of the chain sprockets is engaged by the driving means.

6. A chain drive assembly according to claim 5 wherein the jockey sprocket is pivotable about the axis of the mounting means.

7. A chain drive assembly according to claim 5 wherein the jockey sprocket is pivotable by adjustment means located at the opposite side of the axis of the mounting means to the jockey sprocket.

8. A chain drive assembly according to claim 7 wherein the adjustment means includes a slotted arm, and a trunnion engageable in the slot and movable transversely of an imaginary line joining the axes of the sprockets, the trunnion being carried on a threaded rod rotation of which moves the trunnion and causes the trunnion to bear on the arm and move the jockey sprocket about the axis of the mounting means.

References Cited

UNITED STATES PATENTS 1,119,151  12/1914  Halbleib _____ 74—242.15
3,437,162  4/1969  Diehl et al.

LEONARD HALL GERIN, Primary Examiner

U.S. Cl. X.R.

74—219, 226, 242.15, 606